United States Patent [19]

Kondo et al.

[11] Patent Number: 4,523,711
[45] Date of Patent: Jun. 18, 1985

[54] METHOD FOR BONDING SILVER-BASED CONTACT

[75] Inventors: Kazuo Kondo; Seiji Imamura; Shigemasa Saito; Mamoru Akimoto; Mitsuo Sunaga, all of Kanagawa, Japan

[73] Assignee: Fuji Electric Co., Ltd., Kanagawa, Japan

[21] Appl. No.: 301,864

[22] Filed: Sep. 14, 1981

[30] Foreign Application Priority Data

Sep. 18, 1980 [JP] Japan .................. 55-129696
Aug. 11, 1981 [JP] Japan .................. 56-125485

[51] Int. Cl.$^3$ .................................. B23K 1/04
[52] U.S. Cl. .......................... 228/198; 228/219; 228/263.18
[58] Field of Search .......... 228/198, 219, 221, 124, 228/263.18

[56] References Cited

U.S. PATENT DOCUMENTS

| 2,049,771 | 8/1936 | Gwyn, Jr. | 29/879 |
| 3,686,746 | 8/1972 | Gwyn, Jr. | 29/879 X |
| 3,941,299 | 3/1976 | Godfrey | 228/219 |
| 4,331,286 | 5/1982 | Miyazaki et al. | 228/198 |

FOREIGN PATENT DOCUMENTS

| 28661 | 3/1976 | Japan | 228/263.18 |
| 72759 | 6/1978 | Japan | 228/198 |
| 128689 | 10/1981 | Japan | 228/219 |

Primary Examiner—Kenneth J. Ramsey
Attorney, Agent, or Firm—Sughrue, Mion, Zinn Macpeak & Seas

[57] ABSTRACT

The method of bonding silver-based contact is disclosed. A silver-based contact is brought into contact with a support, at least the surface of which is made of a cupreous material, with a pressure of less than 1 kgf/cm$^2$ exerted therebetween. The contact and support are heated in a non-oxidizing atmosphere at a temperature of more than 700° C.

1 Claim, 11 Drawing Figures

METHOD FOR BONDING SILVER-BASED CONTACT

BACKGROUND OF THE INVENTION

The present invention relates to a method for bonding a contact made of a silver-based material onto a support at least the surface of which is made of a copper-based material.

Because of their good contact-making properties, silver-based contacts made of Ag, Ag-Cd, Ag-CdO and Ag-Ni are used in contacts for many electrical switching applications. But since silver is expensive, such a contact is usually fixed to a support which is in most cases made of copper or an alloy of copper having a high electrical conductivity. As described, for example, in "Denki Zairyo Manual (Manual of Electrical Materials)" published by Shin-Gijutsu Kaihatsu Center, K.K., pp. 635-638, October 1978, contacts are fixed by caulking, welding or soldering, as is conventionally done to bond metal parts. Caulking is suitable for high-speed automatic operation but it has the following defects: a great caulking force is necessary for fixing a large contact, waste of the contact material is unavoidable, and a hardened silver-based contact softens with time and accordingly the adhesion to the support becomes weaker. Welding which uses heat generated by application of electricity to the contact and support is not often used for fixing silver-based contacts. Silver soldering is the most common and is performed by melting a silver foil between the support and the contact by a gas burner, resistance heating or high-frequency induction heating. But even this technique has problems: expensive silver solder is necessary, insertion of a silver solder foil at a predetermined position is not easily done by automation and requires skilled personnel, the flux used can present an environmental hazard, and gas generated by the flux may shift the position of the contact being soldered or form bubbles in the bonding area. Further, since Ag-CdO alloy does not provide sufficient silver soldering property, one of the surface must be unchanged as Ag-Cd alloy by one-sided oxidation method. Alternatively, Ag layer must be formed onto the one of the surfaces. Therefore, such techniques require troublesome bonding process.

Diffusion bonding can also be used. However, this technique cannot be simply applied on a commercial scale because the side of the contact to be bonded to the support must be made of silver only (as noted in Japanese Published Patent Application (OPI) No. 78060/73) and because a vacuum chamber is necessary for performing the technique (as described in Japanese Published Patent Application No. 61456/76).

SUMMARY OF THE INVENTION

Therefore, a primary object of the invention is to provide a simple, commercially practicable method for fixing a silver-based contact onto a support.

This object is achieved in accordance with the invention by a method wherein a silver-based contact is brought into contact with a support at least the surface of which is made of a cupreous material with a pressure of less than 1 kgf/cm$^2$, and the two members are heated in a non-oxidizing atmosphere at a temperature of more than 700° C.

BRIEF DESCRIPTION OF THE DRAWINGS

Preferred embodiments of the invention are hereafter described with reference to the accompanying drawings, wherein.

DESCRIPTION OF THE PREFERRED EMBODIMENTS

Figure 1:
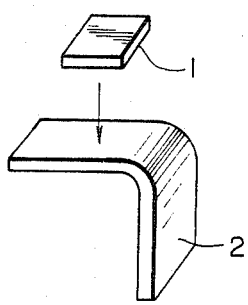
FIGS. 1 and 2 are perspective views illustrating a process according to the invention.
Figure 2:
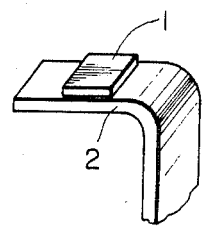

In the embodiment shown in FIG. 1, a silver-based contact 1 and a copper support 2 are degreased and cleaned with acid. The contact is then placed on the support and heated at a temperature higher than 700° C. in an oven filled with a non-oxidizing atmosphere. The atmosphere may be an inert gas such as nitrogen or argon at ordinary pressure or a reducing gas such as hydrogen or decomposed ammonia gas at ordinary pressure, or it may be a vacuum. It is to be noted that in a reducing gas atmosphere, a contact made of a metal oxide such as Ag-CdO may be reduced and have its composition changed so that its contact making properties are decreased. Heating in a vacuum that requires a vacuum chamber is not suitable for large-scale operation since it is difficult to bond many contacts with supports in an oven continuously and because heating and cooling requires a great deal of time. As a result of heating in a non-oxidizing atmosphere, the Ag atoms in the contact and Cu atoms in the support diffuse into each other to form an intermediate bonded phase. Upon cooling by annealing or quenching, the contact is firmly fixed to the support by the intermediate bonded phase as shown in FIG. 2.

Figure 3A:
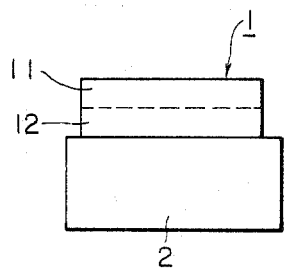
FIGS. 3A to 3C are cross-sectional views schematically showing how a silver-based contact is bonded to a support according to the invention.
Figure 3B:
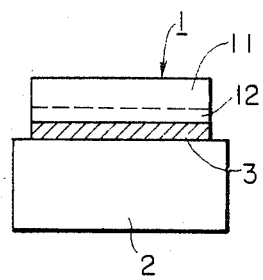
Figure 3C:
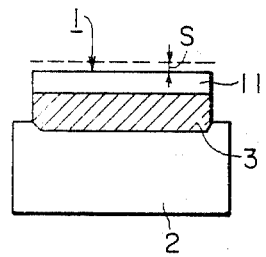

In the embodiment shown schematically in FIGS. 3A to 3C, a contact 1 made of an Ag-CdO layer 11 made by internal oxidation of Ag-Cd alloy and an unoxidized Ag-Cd layer 12 is placed on a support 2 made of tough copper as shown in FIG. 3A and the two members are heated in a nitrogen atmosphere at 750° C., whereupon a diffusion bonded layer 3 having a thickness of 107 μm is formed between the contact and the support as shown in FIG. 3B. The bonded layer consists of 59.2% Ag, 32% Cu and 8.8% Cd. When heating is performed at 800° C. for one minute, the thickness of the diffusion bonded layer is increased to 133 μm with the result that there is no Ag-Cd layer 12 left as shown in FIG. 3C. In this case, part of the bonded layer 3 melts and flows outwardly causing the top of the contact 1 to sink by a distance (s), about 50 μm in the illustrated embodiment.

An importance feature of the bonding method according to the invention is that the contact and the support need not be pressed together during heating, and it is sufficient that they be held in contact by only the weight of either the contact or support. If required, a clip may be used to apply a slight pressure and keep the contact in position with respect to the support. For this purpose, a pressure of less than 1 kgf/cm$^2$ is sufficient. At elevated temperatures, the clip becomes soft and the pressure it applies is reduced to almost zero. Because of the absence of the need for great contact pressure, neither the contact nor the support need be placed in a pressure-applying jig, and there is no possibility that a molten alloy stuck to the jig will make it difficult to remove the combination of contact and support from the jig. There is also no possibility of reduction in the effective thickness of the material of the contact, i.e. wasteful use of expensive silver-based material, due to the significant sinking of the top of the contact upon application of a high pressure as was previously necessary.

Figure 4:
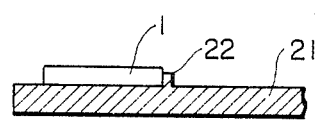
FIG. 4 is a cross-sectional view which shows a method for preventing a contact from being displaced relative to a support.
Figure 5:
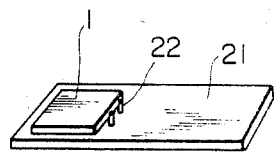
FIG. 5 is a perspective view of FIG. 4.

Illustrated in FIG. 4 is a method for preventing sliding of the contact with respect to the support due to the generation of liquid phase between the contact and the support during heating. In FIG. 4, projections 22 formed on the support 21 are used as guide members with which the contact 1 is installed on the support. The support is heated to bond the contact thereto as shown in FIG. 5.

Figure 6:
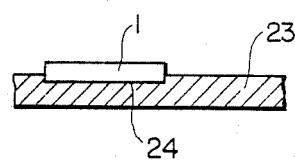
FIG. 6 is a cross-sectional view showing another method for preventing the contact from being displaced relative to the support.
Figure 7:
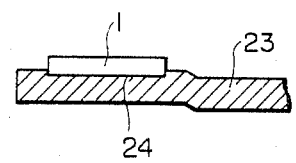
FIG. 7 is a cross-sectional view showing a still another method for preventing such relative displacement effecting a modification of a method according to FIG. 6.

Alternately, in another method, as shown in FIG. 6, a bottom portion of the contact 1 is inserted into a recessed portion 24 formed in the support 23. However, in this case, since distance between stationary and movable contacts in OFF state becomes large due to the insertion, a portion of the support may preferrably be deformed as shown in FIG. 7 to reduce the distance.

Figure 8A:
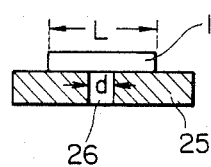
FIGS. 8A and 8B show cross-sectional views showing still another embodiment for preventing such relative displacement between the contact and the support.
Figure 8B:
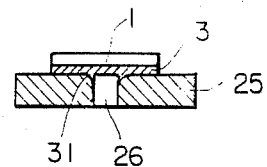

FIGS. 8A and 8B show still another embodiment for preventing the contact from being displaced from the support. In this embodiment, a vent hole 26 is formed in the support 25 on which the contact 1 is mounted. Upon heating, a liquid phase portion 3 is generated between the support 25 and the contact 1. Such liquid phase portion invades the inner peripheral surface of the vent hole 26 to provide the invading portion 31. This invading portion prevents the liquid phase portion from being displaced from the surface of the support 25 owing to the viscosity of the liquid phase with the invading portion 31. As a result, the displacement of the contact relative to the support is prevented during heating. It is desirable to determine an inner dimension d of the vent hole 1/5 to ⅓ as large as a lateral length L of the contact 1. The shape of the vent hole 26 may be circular or rectangular in cross-section. However, in terms of machinability for forming the vent hole with press operation, circular shape may be preferable. This vent hole also serves to perform gas discharging hole for discharging gas generated in the liquid state portion during bonding operation. Therefore, the vent hole is effective for achieving a firmer bonding.

The method of the invention is applicable to a variety of silver-based contacts including not only a two-layer contact of the type described above composed of Ag-CdO and Ag-Cd layers but also a contact made of a single Ag-CdO layer or Ag-Cd layers. Contacts made of other silver-based alloys such as Ag-Ni can also be processed using the invention. Since a pure silver contact achieves the best results in diffusion bonding with copper, a silver alloy contact may advantageously be laminated with a silver layer on the side to be bonded to the support.

Table 1 shows sinking distance and shearing strength at high temperature according to the diffusion bonding method of the present invention, and shows shearing strength at high temperature according to the conventional silver-soldering method for comparison purpose. In the table, a single layer such as Ag layer, Ag-Cd layer and Ag-CdO layer were employed as the contact material.

TABLE 1

| Method | Contact material | Heating Temperature (°C.) | Sinking distance (s) mm | Shearing strength at a temperature of 500° C. (kg/mm$^2$) |
|---|---|---|---|---|
| Diffusion bonding | Ag | 820 | 0.09 | 6.2 |
| | Ag-Cd | 780 | 0.11 | 5.2 |
| | Ag-CdO | 850 | 0.07 | 6.5 |
| Silver brazing | Ag | 800 | — | 4.3 |
| | Ag-Cd | 800 | — | 4.6 |

As is apparent from the Table 1, the resultant contact produced by the diffusion bonding method according to the present invention provided far greater shearing strength than that of the contact produced by the conventional silver soldering method. Therefore, the contact according to the present invention exhibits desirable characteristic in practical use. On the other hand, since liquid phase amount is increased in the ordinary alloy contact, sinking distance (s) becomes large. However, in case of the employment of Ag-CdO layer, sinking distance was shorter than that in the Ag contact. This appears to be due to the fact that the oxide layer (CdO) is interposed between the contact and the support, so that it prevents mutual diffusion to some extent.

Next, explanation is made with reference to the heating temperature. Heating temperature is selected in the range of 780° to 850° C., 700° to 850° C. and 780° to 870° C. for the Ag contact, Ag-Cd contact and Ag-CdO contact, respectively. If the temperature is lower than the lower limit, alloy layer is locally porduced at the contacting surface, so that clearance may be generated between the contact and the support after cooling. Within these ranges, wetting occurs because of the liquid phase alloy along overall contacting area, so that sufficient bonding is obtainable. Further, if the heating temperature exceeds the upper limit, sinking of the contact becomes too large and the liquidized alloy may cover the surface of the contact to degrade the contact performance.

The support may be made of pure copper such as tough pitch copper and oxygen-free copper as well as cupreous alloy such as brass and Cu-Fe alloy (2% Fe). A support composed of a copper layer and an iron layer that is formed by sintering may be used to bond the contact onto the copper layer. The support may be made of easily available ferrous materials. For example, an iron support can be plated with a copper coating of a thickness of about 20 to 30 μm, and a contact placed on the copper coating with an intervening copper foil having a thickness of more than 100 μm. This assembly is then heated in the manner described in connection with the first embodiment. While diffusion-bonding between the contact and copper foil proceeds, the molten Ag-Cu alloy flows in between the copper foil and the copper coating on the support so as to solder the contact onto the support. As a result, the contact is fixed firmly to the iron-based support with an intervening layer made of the residual copper foil. The thickness of the copper plating, the heating temperature and period are set at values such that not all of the copper plating is dissolved into the Ag-Cu alloy.

The contact or the support to be bonded using the invention is not required to have a particularly smooth surface, and the usual sintered surface, rolled surface and otherwise worked surfaces are sufficient. This advantage is due to the fact that the diffusion of Ag and Cu atoms starts at the point of contact between the contact and support, and as the diffusion proceeds, the area of contact spreads gradually.

A bonded layer formed using the invention primarily is compared of Ag and Cu. If the contact is made of a silver alloy, the alloying element is also included in the bonded layer. This layer has a higher melting point and higher strength at elevated temperature than a silver solder layer made of a quaternary alloy of Ag-Cu-Zr-Cd or Ag-Cu-Zr-Sn as conventionally used on account of the ease of soldering operation. Therefore, the contact and the support fixed using the invention do not come apart easily even if there is a temperature increase due to application of a large current. The contact fixed to the support using the invention is well adapted for use as a contact in a circuit breaker as it withstands contact arcing satisfactorily. For such applications, a contact having a pure silver layer on the side which is bonded to the support is used with advantage because it forms a high-melting point bonded layer made of Ag-Cu alloy.

The method of this invention achieves a reliable diffusion bond since the strength of the bond at ordinary temperatures is as high as that obtained by soldering and it is free from the development of flux-induced flaws. As a further advantage, the thickness of the bonded layer can be easily modified by adjusting the heating temperature or time so that the characteristics of the bonded area or the amount of sinking of the top of the contact during bonding can be set at a desired value.

For example, in case the contact bottom is inserted into the recessed portion of the support 23 as shown in FIG. 6, bonding strength can be increased in comparison with the plain to plain bonding. Accordingly, it is possible to reduce the sinking amount of the contact by lowering the heating temperature, i.e., even if the heating temperature is lowered, sufficient bonding is obtainable because of the formation of the recess.

As described, according to the invention, diffusion bonding between a silver-based contact and a support made of a cupreous material is performed by bringing them into contact with little pressure applied therebetween. This eliminates the need of using silver solder or flux and reduces the material costs and the number of steps involved. Furthermore, with a minimum of limits on the material for the contact and the support as well as for the heating atmosphere, the method of the invention provides for simple and reliable bonding of many types of silver-based contacts. As a particular advantage to industry, the invention permits automated production of contacts using a continuous heating oven. In particular, the method according to the present invention is quite advantageous in that the Ag-CdO contact can be bonded to the support with a small sinking amount, such bonding being considered to be almost impossible in conducting silver soldering with a single layer.

What is claimed is:

1. A method of bonding silver-based contacts comprising the steps of: disposing a silver-based contact in contact with a support at least a surface of which is made of a cupreous material with a pressure of less than 1 kgf/cm$^2$ therebetween; heating in the absence of a braze said contact and said support in a non-oxidizing atmosphere at a temperature of more than 700° C. whereby silver atoms in the contact and copper atoms in the support diffuse to form an intermediate bonding phase, and further comprising forming vent hole in said support at a position on which contact is mounted.

* * * * *